United States Patent Office 3,560,235
Patented Feb. 2, 1971

3,560,235
DISPERSIONS
Donald Thomas Sarfas and Arthur Topham, Manchester, England, assignors to Imperial Chemical Industries Limited, London, England
No Drawing. Filed June 21, 1968, Ser. No. 738,786
Claims priority, application Great Britain, June 22, 1967, 28,823/67
Int. Cl. C09c 3/02
U.S. Cl. 106—308                    12 Claims

ABSTRACT OF THE DISCLOSURE

Non-flocculating pigment compositions, suitable for use in printing inks and paints, are prepared by bleeding pigments with essentially colourless compounds containing at least one urea or urethane group and at least one basic amino group, preferably a tertiary amino group, not attached to an aromatic nucleus.

---

This invention relates to dispersions of solid particles in organic media, and more particularly to dispersions of improved stability and solid compositions suitable for incorporation into organic media to give such dispersions.

It is known that dispersions of certain solids such as pigments in organic media tend to flocculate. This may occur for example during storage, or during evaporation of solvent from a coating, of paints or printing inks, leading to a loss of tinctorial strength and of homogeneity. Flocculation may result in increased viscosity, especially under low rates of shear, loss of gloss, loss of hiding power and loss of tinctorial strength.

Various procedures have been described for improving the resistance of pigment dispersions to flocculation. Thus it has been proposed to blend the pigment with a variety of substituted derivatives of the pigment which improve the dispersibility of the pigment; the use of such derivatives of the pigment normally affords a dispersion of shade similar to that from the unmodified pigment, but the surface coatings obtained from these dispersions are often not satisfactory owing to migration of the coloured pigment derivative causing staining of adjacent materials.

It has now been found that certain essentially colourless compounds improve the dispersibility in organic media and also improve the stability of the dispersions so obtained. These compounds do not alter the shade of the pigment, do not lead to staining by migration and may be used with a wide range of pigments.

According to the invention therefore there is provided a pigment composition comprising a pigment intimately blended with an essentially colourless compound containing at least one urea or urethane group and at least one basic amino group not attached directly to an aromatic nucleus.

The pigments which may be used in the process of the invention may be organic, inorganic or carbon black pigments or mixtures of any such pigments.

As examples of organic pigments there may be mentioned azo, thioindigo, anthanthrone and isodibenzathrone pigments, vat dye pigments, triphendioxazine pigments, phthalocyanine pigments for example copper phthalocyanine, its nuclear chlorinated derivatives and copper tetraphenyl or octaphenyl phthalocyanine, other heterocyclic pigments, for example linear quinacridone, lakes of acid, basic and mordant dyestuffs and the other various pigments of the organic type which are enumerated in vol. 2 of "Colour Index 2nd Edition," published jointly in 1956 by the Society of Dyers and Colourists and the American Association of Textile Chemists and Colourists, under the heading of "Pigments" and in subsequent authorized amendments thereto.

As examples of inorganic pigments there may be mentioned chrome pigments including the chromates of lead, zinc, barium and calcium and various mixtures and modifications such as are commercially available as pigments of greenish-yellow to red shades under the names primrose, lemon, middle, orange, scarlet and red chromes. Modified chrome pigments may contain for example sulphate radicals and/or addition metals such as aluminum, molybdenum and tin. Further examples of inorganic pigments are titanium dioxide, zinc oxide, Prussian blue and its mixtures with chrome yellows which are known as Brunswick Greens or chrome greens, cadmium sulphide and sulphoselenide, iron oxides, vermilion and ultramarine.

The process of the invention is of especial value with organic pigments, particularly azo pigments and lakes derived from these.

The amino group may be any primary, secondary or particularly tertiary amino group in which all the substituent groups on the nitrogen atom are alkyl or cycloalkyl groups or substituted derivatives of these, two of which together with the nitrogen atom may form a heterocyclic ring.

Especially valuable essentially colourless compounds are those obtained by condensation of isocyanates, particularly diisocyanates, with aminoalcohols or polyamines, particularly diamines. It is preferred that the compounds contain tertiary amino groups which may conveniently be introduced by the use of an aminoalcohol or diamine containing one tertiary amino group. It is also preferred that a proportion of a compound containing two or more isocyanate reactive groups should also take part in the condensation, for example a diprimary diamine, primary aminoalcohol or glycol. Examples of such condensates are 2,4-tolylenediisocyanate, 2,6-tolylenediisocyanate and mixtures of these with N-octadecyl-1,3-propylenediamine, N-(β-aminoethyl)piperazine, N,N - bis(γ - aminopropyl)-piperazine, or 2-diethylaminoethanol alone or in conjunction with ethylene glycol, N-octadecyldiethanolamine, N-octadecenyldiethanolamine, with N,N - dimethyl - 1,3-propylenediamine in conjunction with ethylenediamine, or the condensates of 4,4'-diisocyanatodiphenylmethane with diethylaminoethanol, of hexamethylenediisocyanate with diethylaminoethanol, or of phenylisocyanate with N,N-dimethyl-1,3-propylenediamine. In those cases wherein essentially difunctional components are the main reactants the proportions should preferably be so chosen that an excess of diisocyanate is avoided.

The pigment composition may contain the essentially colourless compound in proportion by weight from 1% to 100% based on pigment, but the preferred range of proportions is from 2% to 20%.

The pigment may be blended with the essentially colourless compound by any conventional procedure; for example an aqueous suspension of the pigment and of the essentially colourless compound is milled in the presence of a grinding aid, preferably a particulate grinding aid such as sand or beads of porcelain, glass or insoluble plastic material. It is often advantageous to carry out the milling in presence of an acid and subsequently to raise the pH. The pigment composition is then separated from the grinding aid and the aqueous medium and dried. In those cases in which the essentially colourless compound is soluble in the aqueous acid it is frequently only necessary to stir the acid suspension of the pigment containing the colourless compound in solution and to precipitate the colourless compound by addition of for example alkali.

The pigment in powder form may be simply mixed with the powdered essentially colourless compound, thus affording a pigment composition suitable for the preparation of dispersions in organic media which are solvents for the essentially colourless compound.

It is frequently convenient to combine the blending procedure with the step of forming the dispersion in the organic medium. In these cases the pigment and essentially colourless compound are stirred, or preferably milled or ground optionally in presence of particulate grinding aids, with the organic medium until a dispersion suitable for example for use as a printing ink or paint is obtained.

Similar dispersions are obtained by the same procedures from the preformed pigment compositions of the invention and the organic media.

These dispersions, which represent a further feature of this invention are more stable and less viscous than similar dispersions made without the essentially colourless compounds of the invention.

As organic media there may be mentioned for example thin lithographic varnish such as heat bodied linseed oil, gravure such as solutions of zinc/calcium rosinate in toluene or paint media such as solutions of long-oil alkyd resins in hydrocarbon solvents, solutions of nitrocellulose, or solutions of alkyd/melamine-formaldehyde resins in organic solvents which may contain resins, polymers or other ingredients known to be used in such media.

Especially suitable organic media for the manufacture of paints from the pigment compositions are those which contain resins or polymers containing acidic groups such as carboxylic acid, sulphuric acid, phosphonic acid or phosphoric acid groups. Such resins or polymers include carboxyl-containing alkyd resins, which may be modified with drying or non-drying oils or ethylenically unsaturated monomers such as styrene; addition polymers containing acidic groups such as sulphonated polyethylene and polystyrene, copolymers of vinyl sulphonic acid, copolymers of acrylic, methacrylic, maleic, itaconic or crotonic acid or monoesters of maleic acid with acrcylic or metharcylic esters, vinyl acetate, vinyl chloride or styrene, and drying-oil or non-drying oil modifications of such addition polymers; acidic condensation polymers such as polyamides, polyesters, polyesteramides, polyamide-imide and polyimides; and maleinised oils and maleic-modified epoxy esters or maleic modified hydroxy- or epoxy-containing addition polymers.

In these organic media containing acidic resins or polymers it is preferable that the essentially colourless compound be added in amount sufficient that tertiary amino groups equivalent to at least 10% of the acidic groups be present. Paints prepared in this way afford coatings of improved gloss even if the essentially colourless compound be added during rather than before the dispersion stage.

The invention is illustrated but not limited by the following examples in which all parts and percentages are by weight unless otherwise stated.

EXAMPLE 1

A solution of 1 part of the condensate from tolylene diisocyanate and 3-octadecylaminopropylamine in dilute acetic acid is added to a suspension of 10 parts of Colour Index Pigment Yellow 17 in 200 parts of water. The suspension is heated to 80° C. and held at a temperature between 78 and 82° C. for ½ hour. 20 parts of 2 N aqueous ammonia are added to make the suspension slightly alkaline. Heating is maintained for a further ¼ hour and the product is then filtered off, washed and dried at 70° C.

An ink made from 1 part of the product and 3 parts of thin lithographic varnish shows reduced viscosity when compared with a similar ink made from 1 part of Colour Index Pigment Yellow 17, which has been treated as above but omitting the agent, and three parts of thin lithographic varnish. Viscosities are measured with a Ferranti-Shirley Cone-and-Plate viscometer at 25° C.

| | Viscosity (poise) | |
|---|---|---|
| | Ink with agent | Ink without agent |
| Rate of shear (sec. ⁻¹): | | |
| 2 | 6,670 | 9,250 |
| 5 | 3,310 | 4,030 |

The solution of the condensate from tolylene diisocyanate and 3-octadecylaminopropylamine used above is prepared as follows:

A solution of 74.4 parts of 3-octadecylaminopropylamine in 80 parts of acetone is stirred at a temperature between 40 and 45° C. whilst a mixture of 17.4 parts of tolylene diisocyanate (mixed isomers, 80% 2,4- and 20% 2,6-) and 40 parts of acetone is gradually added. After stirring for 30 minutes and cooling to 20°, 42 parts of acetic acid is added and the solution then diluted with water to 500 parts to give an 18.3% solution of the condensate.

EXAMPLE 2

1 part of the condensate of ethylene diamine, 3-dimethylaminopropylamine and tolylene diisocyanate in solution in 10 parts of aqueous N acetic acid is precipitated on 10 parts Colour Index Pigment Red 3 in the manner described in Example 1.

An ink made from 2 parts of the product and 3 parts of thin lithographic varnish shows reduced viscosity over a wide range of shear rates when compared with a similar ink made from 2 parts of Colour Index Pigment Red 3 which has been treated as above but without agent, and 3 parts of thin lithographic varnish. Viscosities are measured with a Ferranti-Shirley cone-and-plate viscometer at 25° C.

| | Viscosity (poise) | |
|---|---|---|
| | Ink with agent | Ink without agent |
| Rate of shear (sec. ⁻¹): | | |
| 2 | 570 | 2120 |
| 5 | 420 | 1290 |
| 20 | 320 | 710 |
| 70 | 275 | 480 |

The condensate of ethylene diamine used above is prepared as follows:

A mixture of 6.03 parts of ethylene diamine, 20.4 parts of 3-dimethylaminopropylamine and 79.1 parts of acetone is stirred at 20–25° C. whilst a mixture of 33.1 parts of tolylene diisocyanate and 79.1 parts of acetone is slowly added. After stirring a further 30 minutes, the product is filtered off, washed with acetone and dried. It is soluble in dilute acetic acid and is reprecipitated by ammonia.

EXAMPLE 3

1 part of the condensate from N-(2-aminoethyl)piperazine and tolylene diisocyanate is precipitated on 10 parts of Colour Index Pigment Red 3 in the manner described in Example 1.

An ink made from 2 parts of the product and 3 parts of thin lithographic varnish shows reduced viscosity measured as described in Examples 1 and 2, when compared with a similar ink made from 2 parts of Colour Index Pigment Red 3, which has been treated as above but without the agent, and 3 parts of thin lithographic varnish.

| | Viscosity (poise) | |
|---|---|---|
| | Ink with agent | Ink without agent |
| Rate of shear (sec. ⁻¹): | | |
| 2 | 850 | 1,980 |
| 5 | 670 | 1,270 |
| 20 | 490 | 690 |
| 70 | 390 | 425 |

The condensate from N-(2-aminoethyl)-piperazine and tolylene diisocyante used above is prepared as follows:

A mixture of 25.8 parts of N-(2-aminoethyl)-piperazine and 80 parts of acetone is stirred at a temperature between 20 and 25° C. whilst a mixture of 21 parts of tolylene diisocyanate and 80 parts of acetone is gradually added. After stirring for 30 minutes the mobile liquid is decanted, leaving the product as a sticky gum, soluble in dilute acetic acid.

EXAMPLE 4

1 part of the condensate from N,N'-bis(3-aminopropyl)-piperazine and tolylene diisocyanate is precipitated on the surface of Colour Index Pigment Red 3 in the manner described in Example 1.

An ink made from 1 part of the product and 3 parts of thin lithographic varnish shows reduced viscosity over a wide range of shear rates when compared with a similar ink made from 1 part of a Colour Index Pigment Red 3, which has been treated as above but omitting the agent, and 3 parts of thin lithographic varnish.

|                      | Viscosity (poise) | |
|----------------------|---------:|---------:|
|                      | Ink with agent | Ink without agent |
| Rate of shear (sec. $^{-1}$): |  |  |
| 2                    | 1,070    | 1,980    |
| 5                    | 765      | 1,270    |
| 20                   | 515      | 690      |
| 70                   | 405      | 425      |

The condensate from N,N'-bis(3-aminopropyl)-piperazine and tolylene diisocyanate used above is prepared as follows:

A mixture of 20 parts of N,N'-bis(3-aminopropyl)piperazine and 80 parts of acetone is stirred at a temperature between 20 and 25° C. whilst a mixture of 15.7 parts of tolylene diisocyanate and 80 parts of acetone is gradually added. After stirring for 30 minutes the product is filtered off, washed with acetone and dried. It is soluble in dilute acetic acid.

EXAMPLE 5

1 part of bis(diethylaminoethoxycarbonylamino)toluene is precipitated on the surface of Colour Index Pigment Red 12 in the manner of Example 1.

The viscosity, measured as described in Example 1, of an ink made from 1 part of the product and 3 parts of thin lithographic varnish is less than that of a similar ink made from 1 part of a Colour Index Pigment Red 12, which has been treated in the above manner but without the agent, and 3 parts of thin lithographic varnish.

|                      | Viscosity (poise) | |
|----------------------|---------:|---------:|
|                      | Ink with agent | Ink without agent |
| Rate of shear (sec. $^{-1}$): |  |  |
| 2                    | 1,475    | 3,000    |
| 5                    | 770      | 1,565    |
| 20                   | 325      | 595      |
| 70                   | 190      | 300      |

The bis(diethylaminoethoxycarbonylamino)toluene used above is prepared as follows:

44.2 parts of 2-diethylaminoethanol are stirred whilst 31.2 parts of tolylene diisocyanate are gradually added, allowing the temperature to rise to between 50 and 55° C. The reaction is completed by stirring for 2 hours. The product is a viscous oil, soluble in dilute acetic acid.

EXAMPLE 6

1 part of the condensate from tolylene diisocyanate, ethylene glycol and 2-diethylaminoethanol is precipitated on the surface of Colour Index Pigment Red 3 in the manner described in Example 1.

An ink made from 1 part of the product and 3 parts of thin lithographic varnish shows reduced viscosity and a wide range of rates of shear compared with a similar ink made from 1 part of a Colour Index Pigment Red 3, which has been treated as above but omitting the agent, and 3 parts of thin lithographic varnish.

|                      | Viscosity (poise) | |
|----------------------|---------:|---------:|
|                      | Ink with agent | Ink without agent |
| Rate of shear (sec. $^{-1}$): |  |  |
| 2                    | 725      | 1,980    |
| 5                    | 555      | 1,270    |
| 20                   | 385      | 690      |
| 70                   | 305      | 425      |

The condensate from tolylene diisocyanate, ethylene glycol and 2-diethylaminoethanol used above is prepared as follows:

A mixture of 20.6 parts of 2-diethylaminoethanol, 6.2 parts of ethylene glycol and 80 parts of acetone is stirred at a temperature between 20 and 25° C., whilst a mixture of 31.2 parts of tolylene diisocyanate and 80 parts of acetone is gradually added. After stirring for 30 minutes the product is filtered off, washed with acetone and dried. A further yield can be isolated from the filtrate by precipitation with water. It is soluble in dilute acetic acid.

EXAMPLE 7

1 part of the condensate from tolylene diisocyanate, 2-diethylaminoethanol and N,N-bis(2 - hydroxyethyl)oleylamine is precipitated from 30% aqueous acetic acid solution on the surface of 10 parts of Colour Index Pigment Yellow 13 in the manner of Example 1.

An ink made from 1 part of the product and 3 parts of thin lithographic varnish shows reduced viscosity when compared with a similar ink made from 1 part of Colour Index Pigment Yellow 13, which has been treated as above but without agent, and 3 parts of the lithographic varnish.

|                      | Viscosity (poise) | |
|----------------------|---------:|---------:|
|                      | Ink with agent | Ink without agent |
| Rate of shear (sec. $^{-1}$): |  |  |
| 2                    | 2,310    | 9,870    |
| 5                    | 1,285    | 4,290    |
| 20                   | 585      | 1,335    |
| 70                   | 300      | 555      |

The condensate from tolylene diisocyanate, 2-diethylaminoethanol and N,N-bis(2 - hydroxyethyl)oleylamine used above is prepared as follows:

A mixture of 19.25 parts of N,N-bis(2-hydroxyethyl) oleylamine, 11.7 parts of 2-diethylaminoethanol and 80 parts of acetone is stirred at a temperature between 20 and 25° C. whilst a mixture of 15.6 parts of tolylene diisocyanate and 40 parts of acetone is gradually added. After stirring for 30 minutes and diluting with water, the product forms a tacky solid which is washed with water by decantation and dried. It is soluble in 30% aqueous acetic acid and is reprecipitated by ammonia.

EXAMPLE 8

1 part of the condensate from tolylene diisocyanate, 2-diethylaminoethanol and N,N-bis(2 - hydroxyethyl)octadecylamine is precipitated on the surface of 10 parts of Colour Index Pigment Yellow 13 in the manner described in Example 1.

The viscosity of an ink made from 1 part of the product and 3 parts of thin lithographic varnish is less than that of a similar ink made from 1 part of Colour Index Pigment Yellow 13, which has been treated as above but omitting the agent, and 3 parts of thin lithographic varnish.

| | Viscosity (poise) | |
|---|---|---|
| | Ink with agent | Ink without agent |
| Rate of shear (sec. ⁻¹): | | |
| 2 | 3,215 | 11,380 |
| 5 | 1,665 | 4,900 |
| 20 | 690 | 1,470 |
| 70 | 390 | 560 |

The condensate from tolylene diisocyanate, 2-diethylaminoethanol and N,N-bis(2 - hydroxyethyl)octadecylamine used above is prepared by the same procedure as that in Example 7, but dilution with water is unnecessary. The product is filtered off, washed with acetone and dried. It is soluble in dilute acetic acid.

EXAMPLE 9

1 part of 4,4′-bis(diethylaminoethoxycarbonylamino) diphenylmethane is precipitated on the surface of 10 parts of Colour Index Pigment Red 12 in the manner described in Example 1.

The viscosity of an ink made from 1 part of the product and 3 parts of thin lithographic varnish is less than that of a similar ink made from 1 part of a Colour Index Pigment Red 12, which has been treated as above but omitting the agent, and 3 parts of thin lithographic varnish.

| | Viscosity (poise) | |
|---|---|---|
| | Ink with agent | Ink without agent |
| Rate of shear (sec. ⁻¹): | | |
| 2 | 880 | 5,820 |
| 5 | 505 | 2,575 |
| 20 | 165 | 860 |
| 70 | 192 | 405 |

The 4,4′ - bis(diethylaminoethoxycarbonylamino)diphenylmethane used above is prepared as follows:

25 parts of 2-diethylaminoethanol are stirred whilst 25 parts of 4,4′-diisocyanatodiphenylmethane are gradually added, allowing the temperature to rise to 50° C. The reaction is completed by stirring at a temperature between 90 and 100° C. for 30 minutes.

EXAMPLE 10

1 part of 1,6-bis(diethylaminoethoxycarbonylamino) hexane is precipitated on the surface of 10 parts of Colour Index Pigment Yellow 13 in the manner described in Example 1.

An ink made from 1 part of the product and 3 parts of thin lithographic varnish has reduced viscosity compared with an ink made from 1 part of a Colour Index Pigment Yellow 13, which has been treated as above but omitting the agent, and 3 parts of thin lithographic varnish.

| | Viscosity (poise) | |
|---|---|---|
| | Ink with agent | Ink without agent |
| Rate of shear (sec. ⁻¹): | | |
| 2 | 2,680 | 11,690 |
| 5 | 1,365 | 5,120 |
| 20 | 540 | 1,635 |
| 70 | 284 | 715 |

The 1,6-bis(diethylaminoethoxycarbonylamino)hexane used above is prepared as follows:

25 parts of 2-diethylaminoethanol are stirred at a temperature between 20 and 30° C. whilst 16 parts of 1,6-disocyanatohexane are gradually added. After stirring at a temperature between 20 and 30° C. for 2–3 hours the product solidifies. It is soluble in dilute acetic acid and is reprecipitated by ammonia.

EXAMPLE 11

An ink made from 1 part of N-3-dimethylaminopropyl-N′-phenylurea, 10 parts of Colour Index Pigment Red 12 and 30 parts of thin lithographic varnish is less viscous than a similar ink made from 1 part of Colour Index Pigment Red 12 and 3 parts of thin lithographic varnish.

The viscosities are measured on a Ferranti-Shirley cone-and-plate viscometer at 25° C.

| | Viscosity (poise) | |
|---|---|---|
| | Ink with agent | Ink without agent |
| Rate of shear (sec. ⁻¹): | | |
| 2 | 1,475 | 2,330 |
| 5 | 785 | 1,165 |

The N-3-dimethylaminopropyl - N′ - phenylurea used above is prepared as follows:

A mixture of 11.2 parts of 3-dimethylaminopropylamine and 36 parts of acetone is stirred at a temperature between 20 and 25° C. whilst a mixture of 11.9 parts of phenyl isocyanate and 29 parts of acetone is gradually added. After stirring for 30 minutes the product is filtered off and dried. After recrystallisation from toluene, it melts at 88.5–91° C.

EXAMPLE 12

The procedure of Example 2 is repeated using instead of the Colour Index Pigment Red 3 metal-free phthalocyanine, copper phthalocyanine, partially chlorinated phthalocyanine, dibromoanthanthrone (Colour Index Vat Orange 3) or the pigment commercially available under the trade name Patrogen Yellow RT.

The inks obtained containing the agent showed reduced viscosities over a wide range of shear rates compared with the similar inks prepared from untreated pigments.

EXAMPLE 13

446 parts of an aqueous paste containing 22.4% of Colour Index Pigment Yellow 1 is stirred with 1000 parts of water whilst a solution of 5 parts of condensate of ethylene diamine, 3-dimethylaminopropylamine and tolylene diisocyanate described in Example 2 in 100 parts of 6% acetic acid is gradually added. The suspension is then made alkaline by the addition of ammonia. The treated pigment is filtered off, washed and dried.

A paint of 13% pigment volume concentration is prepared from this treated pigment by shaking 5.044 parts of treated pigment with 15.1 parts of a 20% solution of a long oil alkyd resin in white spirit and 98 parts of glass beads until the seed level is less than 10µ. 28.1 parts of a 75% solution of the alkyd resin in white spirit is gradually added with stirring, followed by 2.6 parts of white spirit and 2.4 parts of a solution of mixed cobalt, calcium and lead naphthenate dries in white spirit. The flow of this paint is compared with the flow of paints of various pigment volume concentrations made similarly from untreated pigment, using the comb applicator test as described by D. J. Doherty and R. Hurd (Journal of the Oil and Colour Chemists' Association, 1958, volume 41, pp. 56–57). The paint made from the treated pigment has much improved flow properties compared with a paint of equal pigment volume concentration made from the untreated pigment, and has similar flow properties to a paint of only 8% pigment volume concentration made from the untreated pigment.

EXAMPLE 14

0.6 part of the condensate of ethylene diamine, 3-dimethylaminopropylamine and tolylene diisocyanate prepared as described in Example 2, 33 parts of Colour Index Pigment Red 48, are dispersed by ball milling in 67 parts of a 20% solution of a short oil alkyd resin dissolved in xylene, so that a reading of less than 5 microns is obtained in a Hegman gauge. Addition is made of further short oil alkyd resin solution and of melamine-formaldehyde resin solution so that a final pigment to solid resin ratio of 0.28/1 is achieved and a ratio of solid alkyd resin to solid melamine resin of 2/1. The viscosity is finally adjusted by addition of a blend of 4 parts of xylene with 1 part of butanol until the enamel is suitable for application by dipping. Patterns from enamel prepared as described above after stoving at 150° C. for 20 minutes show high gloss. Patterns prepared from enamels prepared similarly but without use of the agent show low gloss.

We claim:
1. A pigment composition comprising an intimate blend of a pigment and an essentially colorless compound which is the reaction product of the condensation of an isocyanate, not in excess over the theoretical proportion, with at least one member selected from the group consisting of an aminoalcohol, a polyamine and mixtures thereof, said colorless condensation product containing at least one basic amino group not directly attached to an aromatic nucleus thereof, and said colorless condensation product being present in an amount of about 1 to about 100 weight percent based on the weight of said pigment.

2. A pigment composition as claimed in claim 1 in which the pigment is an organic pigment.

3. A pigment composition as claimed in claim 1 in which the pigment is an azo pigment or lake derived from an azo pigment.

4. A pigment composition as claimed in claim 1 wherein the basic amino group is a tertiary amino group.

5. A pigment composition as claimed in claim 1 wherein the colourless compound is obtained from a diisocyanate.

6. A pigment composition as claimed in claim 1 wherein the colorless condensation product is present in an amount from 2 to 20 weight percent of the weight of the pigment.

7. A process for the preparation of pigment compositions as claimed in claim 1 which comprises milling a pigment with an essentially colorless condensation product in the presence of a grinding acid.

8. A process for the preparation of pigment compositions as claimed in claim 1 which comprises mixing a pigment with an essentially colorless condensation product in the presence of an acid and subsequently raising the pH by the addition of alkali.

9. Dispersions, suitable for use as printing inks or paints, containing a pigment composition as claimed in claim 1 dispersed in an organic medium.

10. A pigment composition as claimed in claim 1 wherein said isocyanate is selected from the group consisting of phenyl isocyanate, tolylene diisocyanate, 4,4'-diisocyanatodiphenylmethane and 1,6-diisocyanatohexane.

11. A pigment composition as claimed in claim 1 wherein said aminoalcohol is selected from the group consisting of 2-diethylaminoethanol and ethylene glycol with 2-diethylaminoethanol.

12. A pigment composition as claimed in claim 1 wherein said polyamine is selected from the group consisting of 3-octadecylaminopropylamine, ethylene diamine with 3-dimethylaminopropylamine, N-(2-aminoethyl)piperazine, N,N-bis(2-hydroxyethyl)oleylamine, N,N-bis(2-hydroxyethyl)octadecylamine, and 3-dimethylaminopropylamine.

References Cited
FOREIGN PATENTS 591,821   2/1960   Canada _____ 106—308N

TOBIAS E. LEVOW, Primary Examiner

H. M. S. SNEED, Assistant Examiner

U.S. Cl. X.R.

106—288, 289, 309